US012774101B1

(12) United States Patent
Labrecque et al.

(10) Patent No.: US 12,774,101 B1
(45) Date of Patent: Oct. 27, 2026

(54) HYBRID AIRCRAFT POWER PLANT WITH VENTILATED EXHAUST DUCT CAVITY

(71) Applicant: PRATT & WHITNEY CANADA CORP., Longueuil (CA)

(72) Inventors: Michel Labrecque, Sainte-Julie (CA); Bruno Chatelois, Boucherville (CA); Eric S. Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/230,195

(22) Filed: Jun. 6, 2025

(51) Int. Cl.

| | |
|---|---|
| ***B64D 27/33*** | (2024.01) |
| ***B64D 33/08*** | (2006.01) |
| ***F04F 5/20*** | (2006.01) |
| *F01D 25/30* | (2006.01) |
| *F02C 7/18* | (2006.01) |

(52) U.S. Cl.
CPC ............. *B64D 27/33* (2024.01); *B64D 33/08* (2013.01); *F01D 25/30* (2013.01); *F02C 7/18* (2013.01); *F04F 5/20* (2013.01); *F05D 2220/323* (2013.01); *F05D 2220/76* (2013.01)

(58) Field of Classification Search
CPC . B64D 27/33; B64D 33/08; F04F 5/20; F01D 25/30; F01D 15/10; F05D 2220/323; F05D 2220/76; F02C 7/18
See application file for complete search history.

(56) References Cited

U.S. PATENT DOCUMENTS

| | | | | |
|---|---|---|---|---|
| 6,109,562 A * | 8/2000 | Crone | F01D 25/30 | 244/119 |
| 7,134,271 B2 * | 11/2006 | Baughman | F02K 3/077 | 60/228 |
| 7,383,685 B2 * | 6/2008 | Means | F02K 1/825 | 60/772 |
| 7,967,219 B1 * | 6/2011 | Taylor | B64C 29/0066 | 239/265.19 |
| 9,644,538 B2 * | 5/2017 | Dionne | B64D 41/00 | |
| 11,585,291 B2 * | 2/2023 | Muldoon | F02K 1/36 | |
| 12,202,619 B2 | 1/2025 | Zimmermann et al. | | |
| 12,246,844 B1 * | 3/2025 | Weaver | F01D 15/10 | |

(Continued)

OTHER PUBLICATIONS

Wikipedia, Vacuum Ejector, https://en.wikipedia.org/wikiNacuum_ ejector, accessed on Apr. 21, 2025.

(Continued)

*Primary Examiner* — Matthew T Largi
(74) *Attorney, Agent, or Firm* — Norton Rose Fulbright Canada LLP

(57) ABSTRACT

A hybrid aircraft power plant includes an air mover for propelling an aircraft, a gas turbine engine operable to drive the air mover, and an electric machine operable as a motor to drive the air mover. The gas turbine engine includes a turbine disk for extracting energy from a stream of combustion gas and an exhaust duct defining: an exhaust passage for conveying the stream of combustion gas from the turbine disk; and a cavity disposed radially inward of the exhaust passage. A shaft drivingly connects the turbine disk with the electric machine and extends inside the cavity defined by the exhaust duct. A Venturi pump is operable to circulate cooling air inside the cavity of the exhaust duct.

20 Claims, 5 Drawing Sheets

(56) References Cited

U.S. PATENT DOCUMENTS

| | | | | |
|---|---|---|---|---|
| 2014/0144139 | A1* | 5/2014 | Alecu | F02C 7/14<br>29/890.03 |
| 2015/0218967 | A1* | 8/2015 | Anderson | F01D 25/30<br>137/561 A |
| 2016/0258358 | A1* | 9/2016 | Kazlauskas | F01D 25/30 |
| 2022/0045573 | A1* | 2/2022 | Seki | F02C 7/18 |
| 2022/0077749 | A1 | 3/2022 | Cuenot et al. | |
| 2022/0128004 | A1* | 4/2022 | Muldoon | F02C 7/32 |
| 2022/0302801 | A1* | 9/2022 | Osama | H03H 1/0007 |
| 2024/0102432 | A1 | 3/2024 | Aggarwal et al. | |
| 2025/0043719 | A1 | 2/2025 | Sibbach et al. | |

OTHER PUBLICATIONS

NET_VA, 3 Phase Motor Parts—An Introductory Guide, Aug. 20, 2022, https://www.xinnuomotor.com/3-phase-motor-parts, accessed on Apr. 21, 2025.

* cited by examiner

HYBRID AIRCRAFT POWER PLANT WITH VENTILATED EXHAUST DUCT CAVITY

TECHNICAL FIELD

The disclosure relates generally to hybrid aircraft power plants, and more particularly to architectures of hybrid aircraft power plants.

BACKGROUND

A hybrid aircraft power plant that includes a heat engine and an electric motor for propelling an aircraft can provide operational advantages. However, the implementation of hybrid aircraft power plants can be challenging and can result in system architectures that are complex and bulky. Improvement is desirable.

SUMMARY

In one aspect, the disclosure describes a hybrid aircraft power plant including:

an air mover for propelling an aircraft;

a gas turbine engine operable to drive the air mover, the gas turbine engine including:

a turbine disk operable to extract energy from an annular stream of combustion gas, the turbine disk being rotatable about a rotation axis; and an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;

an electric machine drivingly connected to the turbine disk via a shaft extending inside the cavity defined by the exhaust duct, the electric machine being operable as a motor to drive the air mover via the shaft; and a Venturi pump operable to circulate cooling air inside the cavity defined by the exhaust duct.

The Venturi pump may include a fan mounted for common rotation with a rotor of the electric machine.

The rotor of the electric machine may be coaxial with the turbine disk. The rotor of the electric machine may be disposed axially between the fan and the turbine disk.

The Venturi pump may be drivingly connected to the shaft.

The electric machine may be mounted to the exhaust duct. The electric machine may be disposed outside of the cavity defined by the exhaust duct.

A rotor of the electric machine may be coaxial with the turbine disk. The Venturi pump may include a fan mounted for common rotation with the rotor of the electric machine. The rotor of the electric machine may be disposed axially between the fan and the turbine disk.

The Venturi pump may include: a fan operable to induce a motive air flow through an interior of the electric machine; a nozzle configured to receive the motive air flow and cause acceleration the motive air flow; a discharge conduit configured to receive the motive air flow from the nozzle; and a suction conduit establishing fluid communication between the cavity of the exhaust duct and the discharge conduit to convey the cooling air from the cavity of the exhaust duct to the discharge conduit.

The fan may be mounted for common rotation with a rotor of the electric machine.

The electric machine may be mounted to the exhaust duct. The electric machine may be disposed outside of the cavity defined by the exhaust duct. A rotor of the electric machine may be coaxial with the turbine disk. The rotor of the electric machine may be disposed axially between the fan and the turbine disk.

The nozzle may be a first nozzle. The discharge conduit may include, in serial flow communication, a second nozzle and a diffuser.

The cavity defined by the exhaust duct may be disposed between the turbine disk and the electric machine. The electric machine may be disposed between the cavity defined by the exhaust duct and the Venturi pump.

The suction conduit may define an annular passage surrounding the electric machine.

The suction conduit may include a pipe extending axially along the electric machine. The electric machine may be disposed outside of the pipe.

The suction conduit may include a plurality of pipes extending axially along the electric machine. The plurality of pipes may be angularly spaced apart around the electric machine.

A source of the cooling air may include a space inside a nacelle housing the gas turbine engine. The source of the cooling air may include an ambient environment outside of the nacelle. The source of the cooling air may include a gas path of the gas turbine engine.

Embodiments may include combinations of the above features.

In another aspect, the disclosure describes a hybrid power plant of an aircraft. The hybrid power plant includes:

a propeller for propelling the aircraft;

a compressor for pressurizing air;

a combustor in which the pressurized air is mixed with fuel and ignited for generating combustion gas;

a turbine disk for extracting energy from combustion gas, the turbine disk having a rotation axis and being in torque-transmitting engagement with the propeller;

an exhaust duct for receiving the combustion gas from the turbine disk, the exhaust duct defining: an exhaust passage disposed radially outward of the rotation axis of the turbine disk for receiving the combustion gas from the turbine disk and conveying the combustion gas away from the turbine disk; and a cavity fluidly isolated from the exhaust passage and disposed radially inward of the exhaust passage;

an electric machine in torque-transmitting engagement with the turbine disk via a shaft extending inside the cavity defined by the exhaust duct; and a Venturi pump operable to ventilate the cavity defined by the exhaust duct.

The Venturi pump may include a fan mounted for common rotation with a rotor of the electric machine.

Embodiments may include combinations of the above features.

In a further aspect, the disclosure describes a method of operating a hybrid power plant of an aircraft. The method includes:

extracting energy from combustion gas using a turbine;

driving an air mover with the turbine to propel the aircraft;

conveying the combustion gas from the turbine in an exhaust passage of an exhaust duct;

driving the air mover with an electric motor via a shaft drivingly connecting the electric motor to the turbine, the shaft extending inside a cavity of the exhaust duct that is fluidly isolated from the exhaust passage of the exhaust duct; and driving a Venturi pump to circulate cooling air inside of the cavity of the exhaust duct.

Driving the Venturi pump may include driving a fan of the Venturi pump with the shaft.

Driving the Venturi pump may include driving a fan of the Venturi pump mounted for common rotation with a rotor of the electric motor.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure relates to architectures of hybrid aircraft power plants and associated methods of operating hybrid aircraft power plants for propelling aircraft. In some embodiments, the system architectures described herein may facilitate the adaptation of existing gas turbine engine configurations into hybrid power plants. In some embodiments, the system architectures described herein may facilitate the integration of a turboprop gas turbine engine into a hybrid aircraft power plant. For example, a gas turbine engine may be fitted with an exhaust duct that accommodates the installation of an electric motor in proximity with the exhaust duct and configured to assist with the propulsion of the aircraft. In some embodiments, the hybrid aircraft power plant described herein may have a relatively compact architecture with efficient packaging that does not significantly impact the configuration of the gas turbine engine or the size of a nacelle that encloses the hybrid power plant. To protect the electric motor and its associated components from exposure to elevated temperatures from the exhaust duct, hybrid aircraft power plants described herein may include a Venturi pump that is operable to ventilate (i.e., cool) a region near the electric motor.

Aspects of various embodiments are described through reference to the drawings. The term "connected" may include both direct connection (in which two elements contact each other) and indirect connection (in which at least one additional element is located between the two elements). The term "substantially" as used herein may be applied to modify any quantitative representation which could permissibly vary without resulting in a change in the basic function to which it is related.

Figure 1:
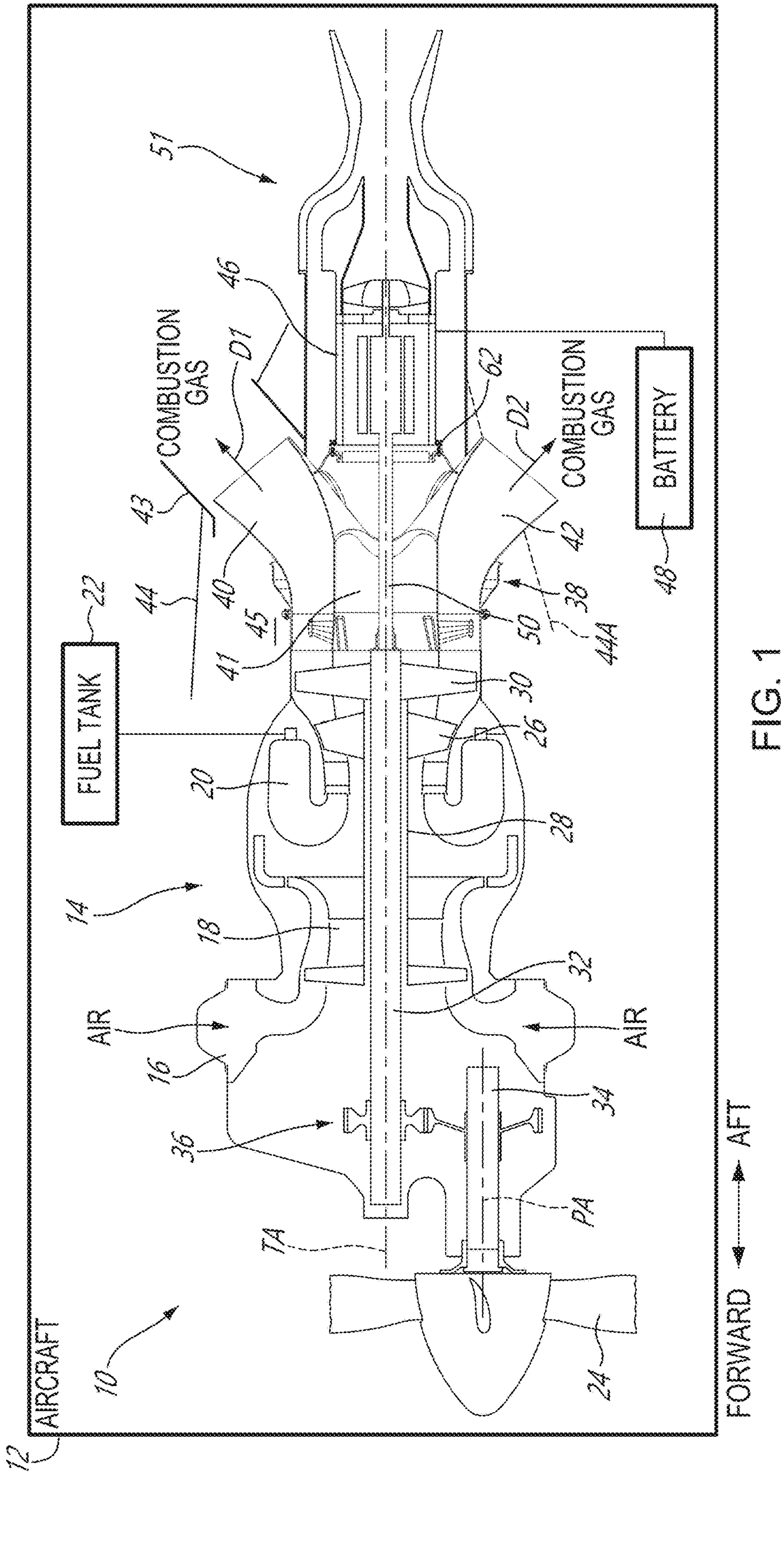
FIG. 1 is a schematic axial cross-sectional view of an exemplary hybrid aircraft power plant as described herein.

FIG. 1 is a schematic axial cross-sectional view of hybrid aircraft power plant 10 (referred hereinafter as "power plant 10") as described herein. Power plant 10 may be used to propel aircraft 12 during one or more phases of flight of aircraft 12. In some embodiments, aircraft 12 may be a fixed wing aircraft. In various embodiments, aircraft 12 may include one or more power plants 10 for propelling aircraft 12. In some embodiments, power plant 10 may be configured for use on rotary wing aircraft (e.g., helicopter). As illustrated in FIG. 1, power plant 10 may include a turboprop gas turbine engine 14 (referred hereinafter as "engine 14") however, aspects of the present disclosure may be incorporated into turboshaft or other type(s) of gas turbine engines as well. The forward direction shown in FIG. 1 corresponds to the usual direction of motion of power plant 10 and of aircraft 12 when power plant 10 is generating thrust to propel aircraft 12 during flight for example. The aft direction shown is opposite to the forward direction.

Engine 14 may be of a type preferably provided for use in subsonic flight. Engine 14 may be a flow-through gas turbine engine where the flow of air and combustion gas through engine 14 is generally toward the aft direction (i.e., from a forward portion of engine 14 to an aft portion of engine 14). For example, engine 14 may include a gas path having a (e.g., radial) air inlet 16 into which ambient air is received and conveyed toward compressor 18. In some embodiments, compressor 18 may be a multistage compressor that pressurized the air received via air inlet 16. The gas path of engine 14 may include combustor 20 in which the compressed air received from compressor 18 is mixed with a combustible fuel from fuel tank 22 and ignited to generate an annular stream of hot combustion gas. Engine 14 may include a turbine section to extract energy from the combustion gas and convert the energy into motive power to drive an air mover such as propeller 24 and thereby propel aircraft 12. In various embodiments, power plant 10 may include one or more air movers suitable for propelling aircraft 12. In some embodiments, such air mover(s) may include a bladed rotor such as a fan or a (e.g., variable-pitch) propeller for example.

In various embodiments, engine 14 may be a single spool gas turbine engine or a multi-spool gas turbine engine. In a dual-spool embodiment illustrated as an example, engine 14 may include a high-pressure spool including one or more high-pressure turbine disks 26 (referred hereinafter in the singular as "HP turbine disk 26") of the turbine section, high-pressure shaft 28 and one or more stages of compressor 18. HP turbine disk 26 may drive the rotation of the high-pressure spool.

Engine 14 may include a low-pressure spool that is separately rotatable from the high-pressure spool. In other words, the high-pressure spool and the low-pressure spool may be mechanically disconnected to permit one spool to freely rotate relative to the other. The low-pressure spool may include one or more low-pressure turbine disks 30 (referred hereinafter in the singular as "LP turbine disk 30"), low-pressure shaft 32 and optionally one or more stages of compressor 18. In some embodiments, high-pressure shaft 28 and low-pressure shaft 32 may be coaxial where high-pressure shaft 28 may be hollow to permit the passage of low-pressure shaft 32 therethrough. LP turbine disk 30 may be disposed downstream of HP turbine disk 26 relative to the gas path conveying combustion gas from combustor 20.

LP turbine disk 30 may drive the rotation of the low-pressure spool and may also drive the rotation of propeller 24. LP turbine disk 30 may be in torque-transmitting engagement with propeller 24 via low-pressure shaft 32. LP turbine disk 30 and low-pressure shaft 32 may be rotatable about turbine axis TA. In some embodiments, propeller 24 may be supported by propeller shaft 34, which may be in torque-transmitting engagement with low-pressure shaft 32 via gear train 36. Propeller shaft 34 and propeller 24 may be rotatable about propeller axis PA, which may be parallel to and offset from turbine axis TA. In other embodiments, propeller 24 and LP turbine disk 30 may be coaxial. In some embodiments, gear train 36 may be of a speed-reducing type so that the rotational speed of propeller shaft 34 may be lower than the rotational speed of low-pressure shaft 32 and of LP turbine disk 30 during operation of power plant 10. Gear train 36 may be part of a speed-reducing gear box also known as a reduction gear box (RGB).

Power plant 10 may include (e.g., bifurcated) exhaust duct 38 (referred herein after as "exhaust duct 38") mounted aft of and downstream of LP turbine disk 30. During operation of engine 14, exhaust duct 38 may receive the annular stream of combustion gas from LP turbine disk 30 and convey the combustion gas away from LP turbine disk 30 via one or more exhaust passages. In some embodiments, exhaust duct 38 may split the annular stream into two (or more) separate streams and then convey the two separate streams of combustion gas in two different general directions of flow referred herein as directions D1, D2. Directions D1 and D2 may be different (e.g., divergent, non-parallel). Directions D1 and D2 may be oriented radially outwardly from turbine axis TA. For example, directions D1 and D2 may have radially outward and aft vector components. In some embodiments, directions D1 and D2 may each be oriented at an acute angle from turbine axis TA. In some embodiments, directions D1 and D2 may each be oriented at an angle of between 30° and 60° from turbine axis TA. In some embodiments, directions D1 and D2 may each be oriented at an angle of between 40° and 50° from turbine axis TA. In some embodiments, directions D1 and D2 may each be oriented at an angle of about 45° from turbine axis TA. In some embodiments, exhaust duct 38 may include first branch 40 defining a first exhaust passage that conveys a first portion of the combustion gas toward first direction D1 away from (e.g., aft of) LP turbine disk 30 and optionally away from turbine axis TA, and second branch 42 defining a second exhaust passage that conveys a second portion of the combustion gas toward second direction D2 away from (e.g., aft of) LP turbine disk 30 and optionally away from turbine axis TA.

The exhaust passages defined by first branch 40 and second branch 42 may be disposed radially outward of turbine axis TA. In some embodiments, the exhaust passages defined by first branch 40 and second branch 42 may be disposed diametrically opposite from each other relative to turbine axis TA. Exhaust duct 38 may define an inner (e.g., central) cavity 41 disposed radially inward of the exhaust passage(s) and axially overlapping with the exhaust passage(s). Cavity 41 may be fluidly isolated from the exhaust passage(s) by one or more walls of exhaust duct 38 so that no substantial amount of combustion gas may flow through cavity 41.

In some embodiments, additional duct work such as respective ejector pipes 43 (only one being shown as an example) may be in fluid communication with first branch 40 and second branch 42 of exhaust duct 38 to optionally ventilate space 45 inside of nacelle 44 and also convey the combustion gas outside of nacelle 44. Nacelle 44 is partially shown in FIG. 1 and may envelope part of power plant 10. For example, in some embodiments, engine 14, exhaust duct 38 and electric machine 46 may be housed in nacelle 44.

Alternatively, first branch 40 and second branch 42 may convey the combustion gas directly outside of nacelle 44 without the use of ejector pipes 43. As an example, FIG. 1 shows alternate nacelle 44A in broken lines where first branch 40 and second branch 42 may convey the combustion gas directly outside of alternate nacelle 44A without the use of ejector pipes 43. Alternate nacelle 44A is partially shown in FIG. 1 and may envelope part of power plant 10. For example, in some embodiments, engine 14, some or all of exhaust duct 38, and electric machine 46 may be housed in alternate nacelle 44A.

In some embodiments, electric machine 46 may be mounted to and supported by exhaust duct 38. Electric machine 46 may be disposed outside (e.g., aft) of cavity 41 defined by exhaust duct 38. Electric machine 46 may be disposed aft of LP turbine disk 30. LP turbine disk 30 may be disposed between electric machine 46 and propeller 24. Electric machine 46 may be drivingly connected to propeller 24 via LP turbine disk 30 and low-pressure shaft 32. In some embodiments, electric machine 46 may be operable as an electric motor for converting electric energy into torque for driving propeller 24. Alternatively or in addition, electric machine 46 may be operable as an electric generator where mechanical energy (e.g., torque*rotational speed) is converted into electric energy. During a motoring mode of operation, electric machine 46 may receive electric energy from a suitable electric power source such as (e.g., rechargeable) battery 48. During a generating mode of operation, electric machine 46 may receive mechanical energy from LP turbine disk 30 and generate electric energy for charging battery 48 or powering one or more other electric loads of power plant 10 or of aircraft 12.

In various embodiments, engine 14 and electric machine 46 may be controlled by one or more controllers so that engine 14 and electric machine 46 may be operated either together or separately to drive propeller 24. In some embodiments, the operation of engine 14 and/or electric machine 46 may be selected based on a phase of flight of aircraft 12. For example, during a take-off phase of a fixed-wing aircraft, both engine 14 and electric machine 46 may be used to cooperatively drive propeller 24. On the other hand, in a leveled cruise phase of flight, only engine 14 may be used to drive propeller 24 in some embodiments.

Electric machine 46 may be operable to drive (i.e., in torque-transmitting engagement with) propeller 24 via low-pressure shaft 32 and/or via separate torque-transmitting engagement between electric machine 46 and propeller 24. In some embodiments, electric machine 46 may be selectively or permanently drivingly connected to low-pressure shaft 32 via coupling shaft 50. Coupling shaft 50 may be connected to low-pressure shaft 32 and to electric machine 46 via suitable splined connections or other means to establish torque transmission between low-pressure shaft 32 and electric machine 46. Coupling shaft 50 may be partially or entirely disposed inside of cavity 41 defined by exhaust duct 38.

In some embodiments, electric machine 46 may be mounted to exhaust duct 38 at a mounting location between first branch 40 and second branch 42 and outside of the exhaust passages. For example, first branch 40 and second branch 42 may extend to opposite sides of electric machine 46. In some embodiments, electric machine 46 may be mounted to be substantially coaxial with LP turbine disk 30 and with low-pressure shaft 32. In some embodiments, coupling shaft 50 may be rotatable about turbine axis TA and consequently be substantially coaxial with LP turbine disk 30, with electric machine 46 and with low-pressure shaft 32.

In some embodiments, (e.g., bifurcated) exhaust duct 38 and the mounting arrangement of electric machine 46 to exhaust duct 38 may be configured as described in U.S. Pat. No. 12,246,844 titled "HYBRID AIRCRAFT POWER PLANT", which is incorporated herein by reference.

Alternatively, power plant 10 may instead include an exhaust duct and mounting arrangement of the electric machine as described in U.S. patent application Ser. No. 18/582,136 filed 20 Feb. 2024 and titled "EXHAUST DUCT MOUNTING STRUCTURE FOR HYBRID AIRCRAFT POWERPLANT", which is incorporated herein by reference. In various embodiments, exhaust duct 38 may include one or more exhaust passages. In various embodiments, electric machine 46 may be mounted directly to exhaust duct 38 or may be mounted to a casing of engine 14 via a suitable intermediate structure (e.g., framework).

In some embodiments, electric machine 46 may be disposed relatively close to the stream(s) of combustion gas conveyed by exhaust duct 38 to promote efficient packaging of power plant 10, and heat from the combustion gas may get transferred toward electric machine 46. In order to protect electric machine 46 and its associated components from potential exposure to excessively high temperatures, power plant 10 may include Venturi pump 51 operable to circulate cooling air inside cavity 41. Venturi pump 51 may be a device (e.g., ejector, eductor, jet pump) that uses the Venturi effect to create a vacuum or suction that induces a circulation of the cooling air inside cavity 41.

Figure 2:
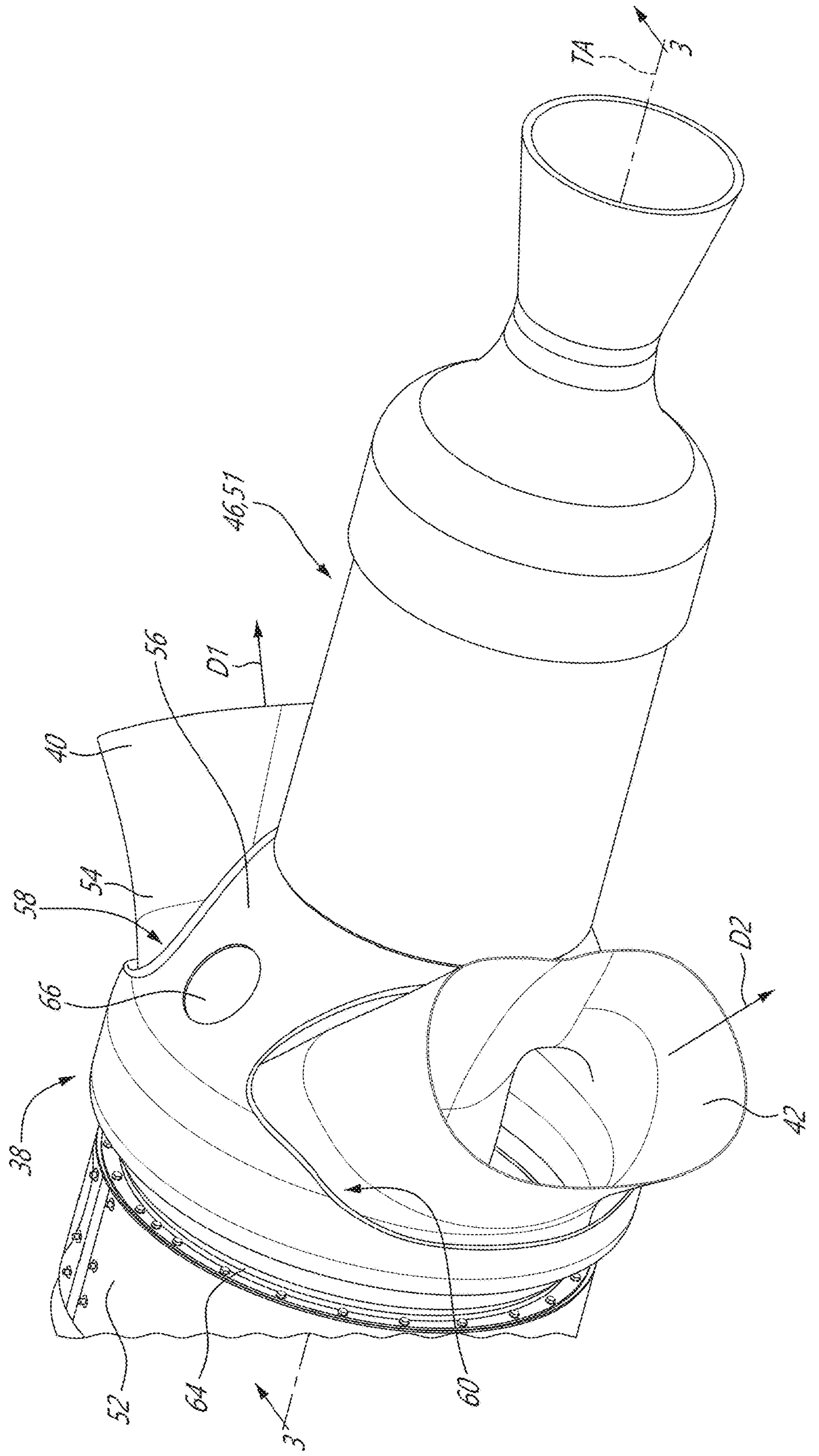
FIG. 2 is a perspective view of an aft portion of the hybrid aircraft power plant of FIG. 1 showing an exemplary exhaust duct and the electric machine mounted to the exhaust duct.

FIG. 2 is a perspective view of an exemplary aft portion of power plant 10 showing exhaust duct 38 with electric machine 46 and Venturi pump 51 mounted to exhaust duct 38. Exhaust duct 38 may be connected (e.g., fastened) to casing 52. In various embodiments, exhaust duct 38 may have a single-walled or a double-walled construction. In an exemplary double-walled embodiment, exhaust duct 38 may include inner wall 54 and outer wall 56. Inner wall 54 may interface directly with the combustion gas and cause the annular stream of combustion gas received from LP turbine disk 30 to be split and conveyed into first branch 40 and second branch 42. Accordingly, inner wall 54 may define first branch 40 and second branch 42.

Outer wall 56 may be disposed over (e.g., radially outwardly of) inner wall 54 and thereby cover part of inner wall 54. In some embodiments, first branch 40 and second branch 42 may extend through outer wall 56. For example, outer wall 56 may include first opening 58 extending therethrough and permitting first branch 40 to pass through outer wall 56 and extend from an interior of outer wall 56 to an exterior of outer wall 56. Outer wall 56 may also include second opening 60 extending therethrough and permitting second branch 42 to pass through outer wall 56 and extend from an interior of outer wall 56 to an exterior of outer wall 56.

Figure 3:
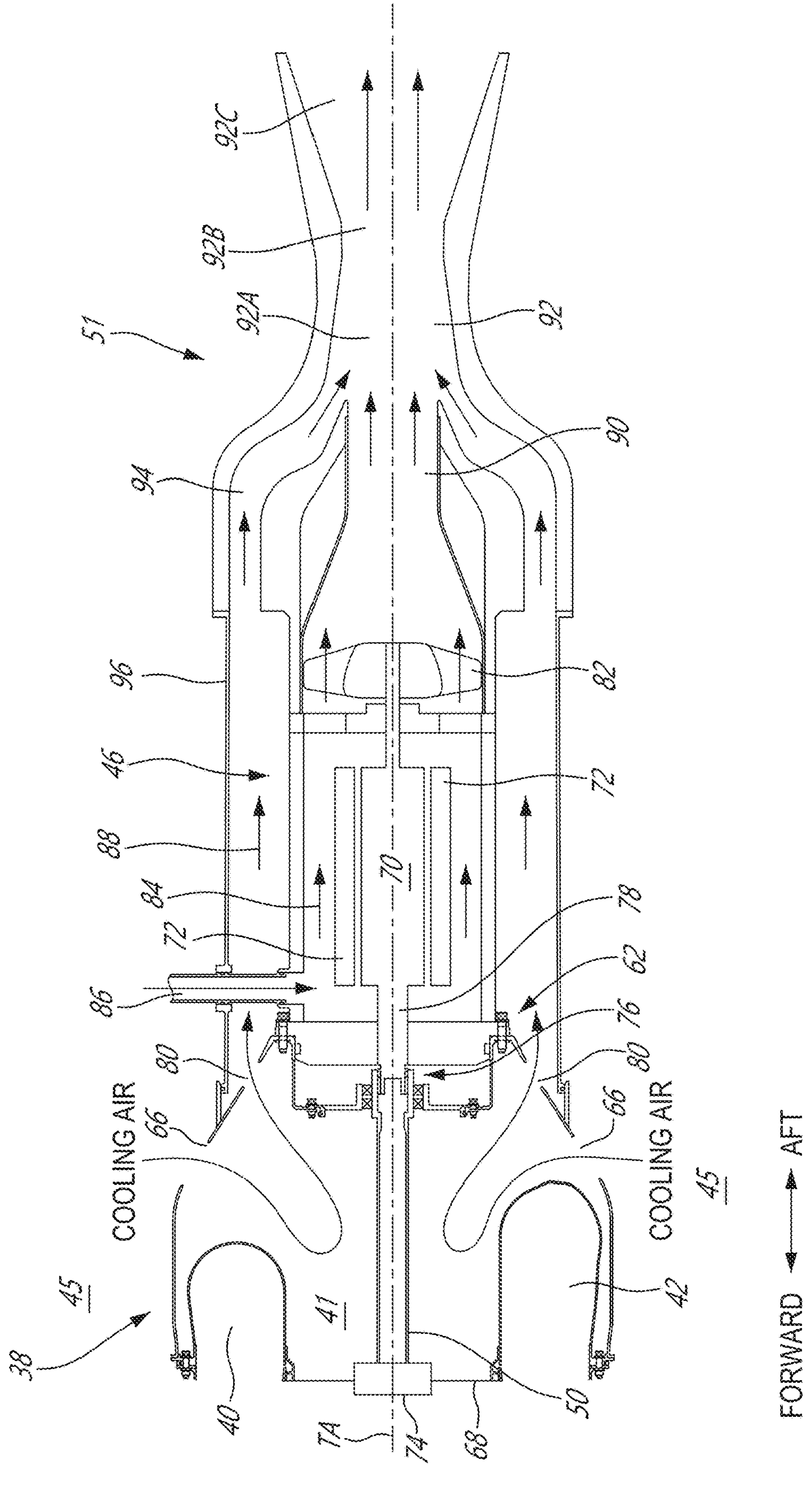
FIG. 3 is a schematic axial cross-sectional view of the aft portion of the hybrid aircraft power plant of FIG. 2 taken along line 3-3 in FIG. 2 showing an exemplary Venturi pump for ventilating a cavity of the exhaust duct.

Electric machine 46 may be mounted (e.g., fastened) to outer wall 56 of exhaust duct 38 at mount 62 (shown in FIG. 3). Mount 62 may be a mounting pad or other suitable surface(s) providing an interface for securing (e.g., fastening) electric machine 46 to outer wall 56. Outer wall 56 may extend between first branch 40 and second branch 42. Mount 62 may be defined between first branch 40 and second branch 42. Inner wall 54 and outer wall 56 of exhaust duct 38 may each be connected (e.g., welded) to ring 64. Ring 64 may be an annular member serving as a base of exhaust duct 38 that may be fastened to casing 52 of engine 14. Accordingly, elements of exhaust duct 38 may be assembled together to define a single component.

Exhaust duct 38 and Venturi pump 51 may be fabricated from a suitable metallic material using known or other sheet metal forming and joining processes. For examples, exhaust duct 38 and/or Venturi pump 51 may be fabricated from a plurality of separate pieces of sheet metal that are formed to a desired shape and subsequently joined together to define the overall shape of exhaust duct 38 and/or Venturi pump 51. In various embodiments, the separate pieces of sheet metal may be welded together or fastened together with rivets for example. In some embodiments, exhaust duct 38 and/or Venturi pump 51 may be fabricated from stainless steel or a suitable nickel-based alloy for example.

In some embodiments, exhaust duct 38 may define one or more inlet openings 66 formed therethrough that provide fluid communication between cavity 41 and a source of cooling air. Inlet opening(s) 66 may extend through inner wall 54 and through outer wall 56 of exhaust duct 38. During operation of Venturi pump 51, the cooling air may be drawn into cavity 41 and also expelled out of cavity 41 to ventilate cavity 41 and thereby cause heat to be expelled out of cavity 41. In some embodiments, the source of cooling air may include space 45 between nacelle 44 and engine 14.

FIG. 3 is a schematic cross-sectional view of the aft portion of power plant 10 along line 3-3 in FIG. 2 showing exemplary Venturi pump 51 for ventilating cavity 41 of exhaust duct 38. Exhaust duct 38 may define one or more exhaust passages (e.g., defined by first branch 40 and second branch 42) disposed radially outward of turbine axis TA for receiving the annular stream of the combustion gas from LP turbine disk 30 and conveying the combustion gas away from LP turbine disk 30. Exhaust duct 38 may also define (e.g., central) cavity 41 disposed radially inward of the exhaust passage(s). A forward end of cavity 41 may be delimited by forward wall 68. Forward wall 68 may define a (e.g., sealed) barrier between cavity 41 and LP turbine disk 30. An aft end of cavity 41 may be delimited by a wall of exhaust duct 38.

Coupling shaft 50 may extend inside cavity 41 and drivingly interconnect low-pressure shaft 32 with rotor 70 of electric machine 46. Electric machine 46 may also include a cooperating stator 72. Alternatively, low-pressure shaft 32 may extend into cavity 41 and be drivingly connected to rotor 70 without the intermediate coupling shaft 50 (e.g., directly). In some embodiments, coupling shaft 50 may be drivingly connected to LP turbine disk 30 via forward coupling 74 establishing a suitable torque-transmitting engagement between a forward end of coupling shaft 50 and an aft end of low-pressure shaft 32. For example, forward coupling 74 may define a splined connection, a keyed connection and/or a flanged connection between low-pressure shaft 32 and coupling shaft 50. Coupling shaft 50 may extend partially or completely through cavity 41. Coupling shaft 50 may be drivingly connected to rotor 70 of electric machine 46 via aft coupling 76 establishing a suitable torque-transmitting engagement between coupling shaft 50 and rotor 70. For example, aft coupling 76 may define a splined connection, a keyed connection and/or a flanged connection between an aft end of coupling shaft 50 and an input/output shaft 78 of electric machine 46.

Venturi pump 51 may be operable to circulate cooling air inside cavity 41 defined by exhaust duct 38. The operation of Venturi pump 51 may cause cooling air to be drawn into cavity 41 via inlet opening(s) 66. While inside of cavity 41, the cooling air may collect heat transferred from the combustion gas that is conducted through the wall(s) of exhaust duct 38. The operation of Venturi pump 51 may also cause cooling air to be expelled from cavity 41 via one or more outlet openings 80 formed through the wall(s) of exhaust duct 38. The heated cooling air that is exiting cavity 41 may carry heat out of cavity 41. The flow of cooling air through cavity 41 may cool cavity 41 and thereby cool the environment around electric machine 46. In other words, the cooling air may cool a space between electric machine 46 and the exhaust passage(s) defined by exhaust duct 38.

As illustrated in FIG. 3, electric machine 46 may be mounted to exhaust duct 38 via mount 62 and be disposed outside (e.g., aft) of internal cavity 41 defined by exhaust duct 38. In other words, cavity 41 defined by exhaust duct 38 may be disposed axially between LP turbine disk 30 and electric machine 46. In some embodiments, electric machine 46 may be disposed between cavity 41 defined by exhaust duct 38 and Venturi pump 51. Venturi pump 51 may be disposed aft of cavity 41. Venturi pump 51 may be disposed aft of exhaust duct 38. Venturi pump 51 may be disposed aft of LP turbine disk 30. Venturi pump 51 may be disposed aft of electric machine 46. Electric machine 46 may be disposed between LP turbine disk 30 and Venturi pump 51.

Venturi pump 51 may include fan 82 operable to induce motive air flow 84 through an interior of electric machine 46. Motive air flow 84 may cool the interior of electric machine 46 and also serve to drive the operation of Venturi pump 51. Motive air flow 84 may come from a source of cooling air such as an ambient environment outside of nacelle 44, space 45 between nacelle 44 and engine 14, and/or air that is bled from a gas path of engine 14 (e.g., upstream of or at compressor 18) for example. Motive air flow 84 may be introduced into a housing of electric machine 46 via one or more supply conduits 86.

In some embodiments, fan 82 may be a bladed rotor mounted for common rotation with rotor 70 of electric machine 46. Fan 82 may be an axial fan. Fan 82 may be part of electric machine 46. Fan 82 may be disposed aft of rotor 70 of electric machine 46. Rotor 70 of electric machine 46 may be disposed axially between fan 82 and LP turbine disk 30. Fan 82 and rotor 70 may be coaxial. Rotor 70 and fan 82 may be coaxial with LP turbine disk 30. When electric machine 46 is operating as an electric motor, fan 82 may be driven by electric machine 46. When electric machine 46 is operating as an electric generator, fan 82 may be driven by LP turbine disk 30 via coupling shaft 50 and input/output shaft 78 for example. Fan 82 may be drivingly connected (e.g., mounted) to input/output shaft 78, which may be drivingly connected to coupling shaft 50, which may in turn be drivingly connected to LP shaft 32.

In some embodiments, fan 82 may disposed aft of rotor 70 and accordingly may draw motive air flow 84 through electric machine 46. Supply conduit(s) 86 may introduce motive air flow 84 at a location that is closer to a forward end of electric machine 46 than to an aft end of electric machine 46 so that motive air flow 84 may flow along at least a majority (i.e., more than half) of an axial length of electric machine 46 and axially out of a perforated end plate of electric machine 46.

Venturi pump 51 may utilize the Venturi effect where motive air flow 84 is increased in velocity and decreased in pressure to create a pressure drop which in turn creates a suction that draws in (i.e., entrains) cooling air flow 88. Accordingly, Venturi pump 51 may be operable to circulate the cooling air inside cavity 41 defined by exhaust duct 38. Venturi pump 51 may include converging nozzle 90 configured to receive motive air flow 84 exiting electric machine 46 and that is propelled by fan 82, and cause acceleration of motive air flow 84 by providing an axially reducing cross-sectional area for motive air flow 84 to flow through.

Venturi pump 51 may include discharge conduit 92 disposed downstream of nozzle 90 and configured to receive motive air flow 84 from nozzle 90. Discharge conduit 92 may define a suction chamber which draws cooling air flow 88 via one or more suction conduits 94 establishing fluid communication between cavity 41 of exhaust duct 38 and discharge conduit 92 to convey cooling air flow 88 from cavity 41 to discharge conduit 92. Momentum may be transferred from motive air flow 84 to cooling air flow 88 to accelerate the cooling air. Motive air flow 84 and cooling air flow 88 may be mixed together in discharge conduit 92. The mixture of motive air flow 84 and cooling air flow 88 may be released to the ambient environment outside of power plant 10 through an outlet of discharge conduit 92. In some embodiments, discharge conduit 92 may include, in serial flow communication, converging nozzle 92A, throat 92B (i.e., the narrowest part) and diverging diffuser 92C.

In some embodiments, suction conduit(s) 94 may define an annular passage surrounding electric machine 46. For example, (e.g., metallic, cylindrical) jacket 96 may be installed around and radially spaced apart from the (e.g., cylindrical) housing of electric machine 46 to define a radial gap therebetween. Jacket 96 may define a plenum duct that is wrapped around electric machine 46.

Jacket 96 and the housing of electric machine 46 may define an annular passage therebetween allowing cooling air flow 88 to travel in the aft direction and axially along electric machine 46. Cooling air flow 88 may be received into suction conduit(s) 94 via outlet openings 80 formed through exhaust duct 38 and establishing fluid communication between cavity 41 and suction conduit(s) 94.

Components of Venturi pump 51 may be made from (e.g., metallic) materials suitable for exposure to the temperature(s) of the applicable air flows, and other environmental or operating conditions. The cooling air that is circulated into cavity 41 may by supplied from a source of cooling air such as an ambient environment outside of nacelle 44, space 45 between nacelle 44 and engine 14, air that is bled from the gas path of engine 14 (e.g., upstream of or at compressor 18) for example.

In some embodiments, fan 82 may be integrated with electric machine 46, and Venturi pump 51 may provide a relatively efficient way to use fan 82 to drive cooling air through cavity 41. In other words, motive air flow 84 that is propelled by fan 82 may be reused to drive Venturi pump 51 before being released to the ambient environment outside of power plant 10. The cooling of cavity 41 may offer an environmental (heat) shielding protection for electric machine 46 and/or for other associated components such as electric wiring, sensor(s) and connector(s). The use of jacket 96 to define suction conduit 94 may also fire shielding protection for electric machine 46 and/or for other associated components such as electric wiring, sensor(s) and connector(s).

Figure 4:
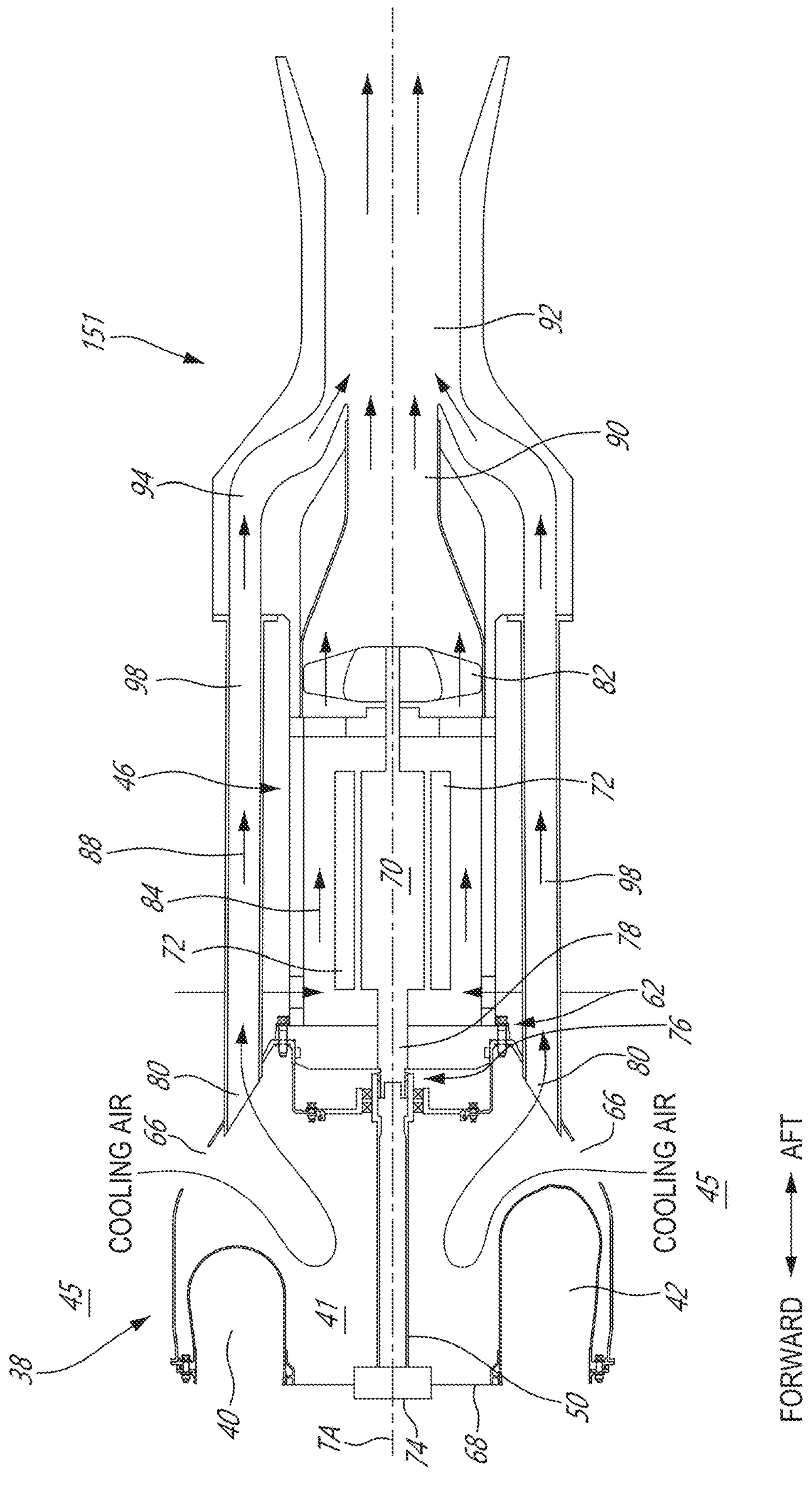
FIG. 4 is another schematic axial cross-sectional view of an aft portion of a hybrid aircraft power plant showing another exemplary Venturi pump for ventilating the cavity of the exhaust duct.

FIG. 4 is another schematic axial cross-sectional view of an aft portion of a hybrid aircraft power plant showing another exemplary Venturi pump 151 for ventilating cavity 41 of exhaust duct 38. Venturi pump 151 may include elements of Venturi pump 51 previously described above. Like elements are labelled using like reference numerals. In contrast with Venturi pump 51, Venturi pump 151 may have a different configuration of suction conduit(s) 94. For example, suction conduit(s) 94 of Venturi pump 151 may include one or more pipes 98 extending axially along electric machine 46 and fluidly connecting cavity with discharge conduit 92. Pipe(s) 98 may be disposed radially outwardly from electric machine 46 and electric machine 46 may be disposed outside of pipe(s) 98. In embodiments where Venturi pump 151 include a plurality of pipes 98, such pipes 98 may be angularly spaced apart (e.g., circumferentially distributed) around electric machine 46 and about turbine axis TA. Cooling air flow 88 may be received into pipe(s) 98 via respective outlet openings 80 defined through exhaust duct 38.

Figure 5:
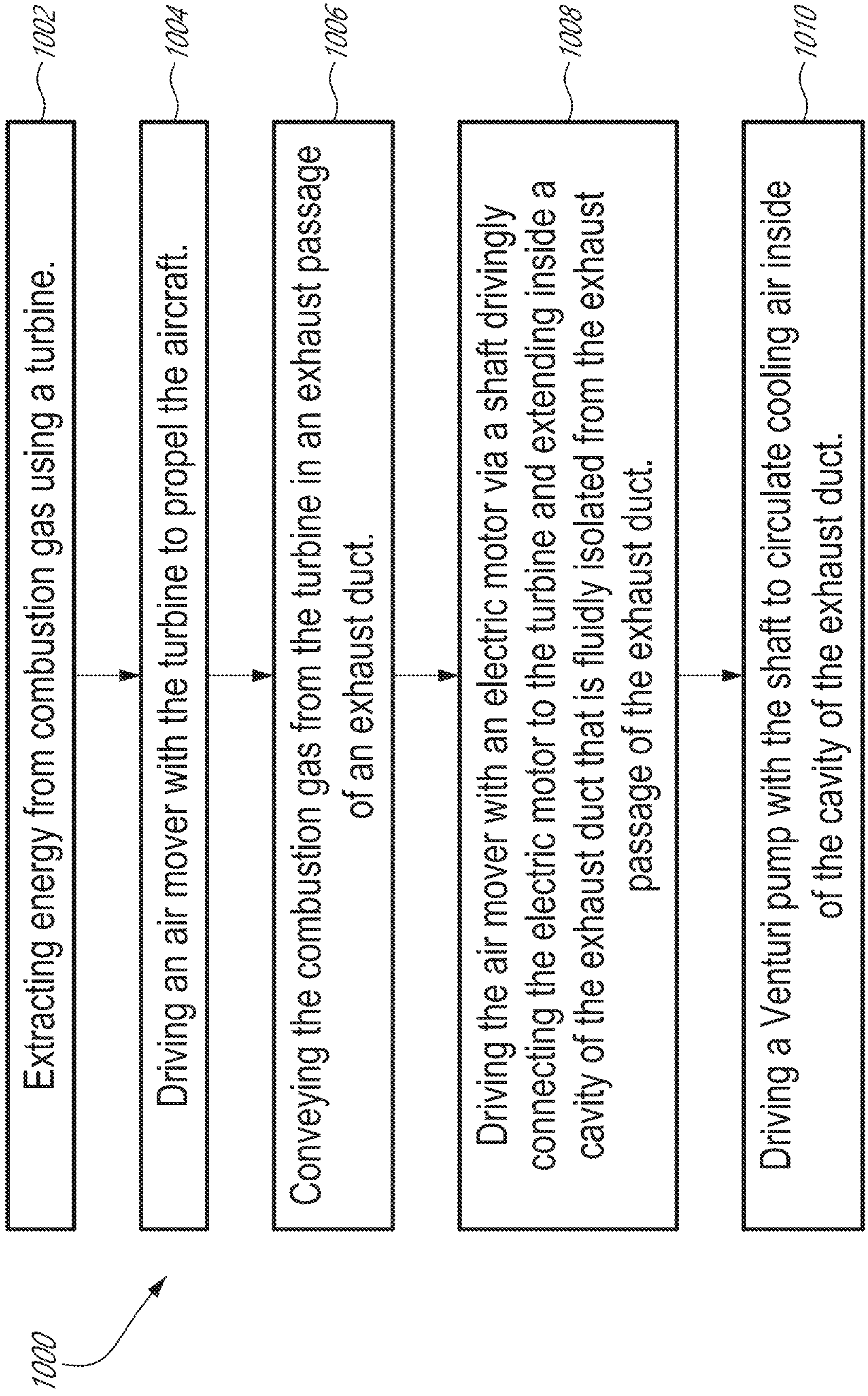
FIG. 5 is a flow diagram of a method of operating a hybrid aircraft power plant.

FIG. 5 is a flow diagram of a method 1000 of operating a hybrid aircraft power plant. Method 1000 may be performed using power plant 10 or using another power plant 10. Method 1000 may include aspects of power plant 10. Method 1000 may include other actions disclosed herein. In various embodiments, method 1000 may include:

extracting energy from combustion gas using a turbine (e.g., LP turbine disk 30) (block 1002);

driving an air mover (e.g., propeller 24) with the turbine to propel aircraft 12 (block 1004);

conveying the combustion gas from the turbine in an exhaust passage of exhaust duct 38 (block 1006);

driving the air mover with an electric motor (e.g., electric machine 46) via a shaft (e.g., coupling shaft 50) drivingly connecting the electric motor to the turbine, the shaft extending inside cavity 41 of exhaust duct 38 that is fluidly isolated from the exhaust passage of exhaust duct 38 (block 1008); and driving Venturi pump 51, 151 to circulate cooling air inside of cavity 41 of exhaust duct 38 (block 1010).

In some embodiments, driving Venturi pump 51, 151 may include driving fan 82 of Venturi pump 51, 151 with coupling shaft 50. Driving Venturi pump 51, 151 may include driving fan 82 mounted for common rotation with rotor 70 of electric machine 46. Fan 82 may be a bladed rotor that is part of electric machine 46 and that is operable to cool the interior of electric machine 46 by inducing an air flow inside the housing of electric machine 46. In some embodiments, fan 82, rotor 70 and LP turbine 30 may rotate together at the same speed and coaxially. Driving fan 82 may include rotating fan 82 together and coaxially with coupling shaft 50.

Driving the air mover with the turbine to propel aircraft 12 may include propelling aircraft 12 in a forward direction. Fan 82 may be an axial fan driving motive air flow 84 generally in the aft direction opposite the forward direction.

Venturi pump 51, 151 may include variable geometry devices or other means operatively connected to a controller to actively control the operation of Venturi pump 51, 151 and thereby regulate a sensed temperature inside of cavity 41 and/or another temperature associated with an aft portion of hybrid aircraft power plant 10. Such variable geometry devices may include a variable orientation vane, a variable area nozzle, and/or a variable area throat operable to throttle motive air flow 84 and/or cooling air flow 88 through Venturi pump 51, 151.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A hybrid aircraft power plant comprising:

an air mover for propelling an aircraft;

a gas turbine engine operable to drive the air mover, the gas turbine engine including:

a turbine disk operable to extract energy from an annular stream of combustion gas, the turbine disk being rotatable about a rotation axis; and an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;

an electric machine drivingly connected to the turbine disk via a shaft extending inside the cavity defined by the exhaust duct, the electric machine being operable as a motor to drive the air mover via the shaft; and a Venturi pump operable to circulate cooling air inside the cavity defined by the exhaust duct, wherein:

the Venturi pump includes a fan mounted for common rotation with a rotor of the electric machine;

the rotor of the electric machine is coaxial with the turbine disk; and the rotor of the electric machine is disposed axially between the fan and the turbine disk.

2. The hybrid aircraft power plant as defined in claim 1, wherein the Venturi pump is drivingly connected to the shaft.

3. The hybrid aircraft power plant as defined in claim 1, wherein:

the electric machine is mounted to the exhaust duct; and the electric machine is disposed outside of the cavity defined by the exhaust duct.

4. The hybrid aircraft power plant as defined in claim 1, wherein:

the fan is operable to induce a motive air flow through an interior of the electric machine;

the Venturi pump includes:

a nozzle configured to receive the motive air flow and cause acceleration the motive air flow;

a discharge conduit configured to receive the motive air flow from the nozzle; and a suction conduit establishing fluid communication between the cavity of the exhaust duct and the discharge conduit to convey the cooling air from the cavity of the exhaust duct to the discharge conduit.

5. The hybrid aircraft power plant as defined in claim 4, wherein:

the electric machine is mounted to the exhaust duct; and the electric machine is disposed outside of the cavity defined by the exhaust duct.

6. The hybrid aircraft power plant as defined in claim 4, wherein:

the nozzle is a first nozzle; and the discharge conduit includes, in serial flow communication, a second nozzle and a diffuser.

7. The hybrid aircraft power plant as defined in claim 4, wherein:

the cavity defined by the exhaust duct is disposed between the turbine disk and the electric machine; and the electric machine is disposed between the cavity defined by the exhaust duct and the Venturi pump.

8. The hybrid aircraft power plant as defined in claim 7, wherein the suction conduit defines an annular passage surrounding the electric machine.

9. The hybrid aircraft power plant as defined in claim 7, wherein:

the suction conduit includes a pipe extending axially along the electric machine; and the electric machine is disposed outside of the pipe.

10. The hybrid aircraft power plant as defined in claim 7, wherein:

the suction conduit includes a plurality of pipes extending axially along the electric machine; and the plurality of pipes are angularly spaced apart around the electric machine.

11. The hybrid aircraft power plant as defined in claim 1, wherein a source of the cooling air includes a space inside a nacelle housing the gas turbine engine.

12. The hybrid aircraft power plant as defined in claim 1, wherein a source of the cooling air includes an ambient environment outside of a nacelle housing the gas turbine engine.

13. The hybrid aircraft power plant as defined in claim 1, wherein a source of the cooling air includes a gas path of the gas turbine engine.

14. A hybrid power plant of an aircraft, the hybrid power plant comprising:

a propeller for propelling the aircraft;

a compressor for pressurizing air;

a combustor in which the pressurized air is mixed with fuel and ignited for generating combustion gas;

a turbine disk for extracting energy from combustion gas, the turbine disk having a rotation axis and being in torque-transmitting engagement with the propeller;

an exhaust duct for receiving the combustion gas from the turbine disk, the exhaust duct defining: an exhaust passage disposed radially outward of the rotation axis of the turbine disk for receiving the combustion gas from the turbine disk and conveying the combustion gas away from the turbine disk; and a cavity fluidly isolated from the exhaust passage and disposed radially inward of the exhaust passage;

an electric machine in torque-transmitting engagement with the turbine disk via a shaft extending inside the cavity defined by the exhaust duct; and a Venturi pump operable to ventilate the cavity defined by the exhaust duct, the Venturi pump including a fan mounted for common rotation with a rotor of the electric machine.

15. A method of operating a hybrid power plant of an aircraft, the method comprising:

extracting energy from combustion gas using a turbine;

driving an air mover with the turbine to propel the aircraft;

conveying the combustion gas from the turbine in an exhaust passage of an exhaust duct;

driving the air mover with an electric motor via a shaft drivingly connecting the electric motor to the turbine, the shaft extending inside a cavity of the exhaust duct that is fluidly isolated from the exhaust passage of the exhaust duct; and driving a Venturi pump to circulate cooling air inside of the cavity of the exhaust duct by driving a fan of the Venturi pump with the shaft.

16. A method of operating a hybrid power plant of an aircraft, the method comprising:

extracting energy from combustion gas using a turbine;

driving an air mover with the turbine to propel the aircraft;

conveying the combustion gas from the turbine in an exhaust passage of an exhaust duct;

driving the air mover with an electric motor via a shaft drivingly connecting the electric motor to the turbine, the shaft extending inside a cavity of the exhaust duct that is fluidly isolated from the exhaust passage of the exhaust duct; and driving a Venturi pump to circulate cooling air inside of the cavity of the exhaust duct by driving a fan of the Venturi pump mounted for common rotation with a rotor of the electric motor.

17. A hybrid aircraft power plant comprising:

an air mover for propelling an aircraft;

a gas turbine engine operable to drive the air mover, the gas turbine engine including:

a turbine disk operable to extract energy from an annular stream of combustion gas, the turbine disk being rotatable about a rotation axis; and an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;

an electric machine drivingly connected to the turbine disk via a shaft extending inside the cavity defined by the exhaust duct, the electric machine being operable as a motor to drive the air mover via the shaft; and a Venturi pump operable to circulate cooling air inside the cavity defined by the exhaust duct, the Venturi pump including:

a fan operable to induce a motive air flow through an interior of the electric machine, the fan being mounted for common rotation with a rotor of the electric machine;

a nozzle configured to receive the motive air flow and cause acceleration the motive air flow;

a discharge conduit configured to receive the motive air flow from the nozzle; and a suction conduit establishing fluid communication between the cavity of the exhaust duct and the discharge conduit to convey the cooling air from the cavity of the exhaust duct to the discharge conduit.

18. A hybrid aircraft power plant comprising:

an air mover for propelling an aircraft;

a gas turbine engine operable to drive the air mover, the gas turbine engine including:

a turbine disk operable to extract energy from an annular stream of combustion gas, the turbine disk being rotatable about a rotation axis; and an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;

an electric machine drivingly connected to the turbine disk via a shaft extending inside the cavity defined by the exhaust duct, the electric machine being operable as a motor to drive the air mover via the shaft; and a Venturi pump operable to circulate cooling air inside the cavity defined by the exhaust duct, the Venturi pump including:

a fan operable to induce a motive air flow through an interior of the electric machine;

a nozzle configured to receive the motive air flow and cause acceleration the motive air flow;

a discharge conduit configured to receive the motive air flow from the nozzle; and a suction conduit establishing fluid communication between the cavity of the exhaust duct and the discharge conduit to convey the cooling air from the cavity of the exhaust duct to the discharge conduit, wherein:

the nozzle is a first nozzle; and the discharge conduit includes, in serial flow communication, a second nozzle and a diffuser.

19. A hybrid aircraft power plant comprising:

an air mover for propelling an aircraft;

a gas turbine engine operable to drive the air mover, the gas turbine engine including:

a turbine disk operable to extract energy from an annular stream of combustion gas, the turbine disk being rotatable about a rotation axis; and an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;

an electric machine drivingly connected to the turbine disk via a shaft extending inside the cavity defined by the exhaust duct, the electric machine being operable as a motor to drive the air mover via the shaft; and a Venturi pump operable to circulate cooling air inside the cavity defined by the exhaust duct, the Venturi pump including:

a fan operable to induce a motive air flow through an interior of the electric machine;

a nozzle configured to receive the motive air flow and cause acceleration the motive air flow;

a discharge conduit configured to receive the motive air flow from the nozzle; and a suction conduit establishing fluid communication between the cavity of the exhaust duct and the discharge conduit to convey the cooling air from the cavity of the exhaust duct to the discharge conduit, wherein:

the cavity defined by the exhaust duct is disposed between the turbine disk and the electric machine;

the electric machine is disposed between the cavity defined by the exhaust duct and the Venturi pump;

the suction conduit includes a pipe extending axially along the electric machine; and the electric machine is disposed outside of the pipe.

20. The hybrid aircraft power plant as defined in claim 19, wherein:

the pipe is a first pipe;

the suction conduit includes a plurality of pipes including the first pipe, the plurality of pipes extending axially along the electric machine; and the plurality of pipes are angularly spaced apart around the electric machine.

* * * * *